Inventor
Edward Latta
By Joseph A. Semignani
Attorney

United States Patent Office 3,463,954
Patented Aug. 26, 1969

3,463,954
MOTOR ARMATURE BEARING ASSEMBLY RESILIENTLY SUPPORTED IN A LONGITUDINALLY SPLIT HOUSING
Edward Latta, Owosso, Mich., assignor to Controls Company of America, Melrose Park, Ill., a corporation of Delaware
Filed Aug. 3, 1967, Ser. No. 658,161
Int. Cl. H02k 7/08, 5/16
U.S. Cl. 310—90     12 Claims

ABSTRACT OF THE DISCLOSURE

A pair of axially aligned bearing receiving areas are formed in a longitudinally split motor housing. A sleeve bearing is assembled onto each of the opposite axial ends of the motor armature shaft and a resilient sleeve is engaged between the outer surface of the sleeve bearing and the inner surfaces of the bearing receiving areas. The resilient sleeve holds the sleeve bearings with a desired adjusted axial spacing therebetween, specifically in engagement with shoulders at the opposite axial ends of the armature, to eliminate armature end play.

BACKGROUND OF INVENTION

Field of invention

This invention relates to electric motors and, more particularly, to bearing support assemblies for motor armatures.

Description of prior art

The need for elimination of end play in motor armature assemblies is recognized in the electric motor industry and numerous arrangements have been proposed as solutions to this problem. Generally, these prior arrangements have involved relatively complex bearing constructions and/or motor assembly procedures.

SUMMARY OF INVENTION

In accordance with this invention, the bearing support for a motor armature assembly includes a bearing engaged on the armature shaft and a resilient member is positioned between the bearing and a housing support, preferably a suitably deformed surface in the motor housing. The resilient sleeve is compressed between the bearing and the support surfaces to hold the sleeve bearing in an adjusted position and thereby eliminate end play in the armature assembly. Preferably, this bearing arrangement is provided at both of the opposite axial ends of the armature shaft so that the armature assembly is held against axial movement between the two spaced bearing assemblies.

DESCRIPTION OF PREFERRED EMBODIMENT

Figure 1:
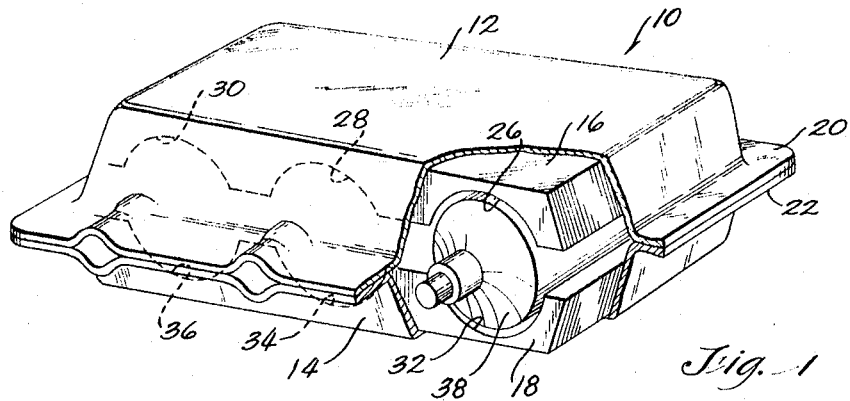
FIG. 1 is a perspective of a motor assembly incorporating this bearing assembly.

Although not limited to use in connection with any particular motor structure, the bearing assembly of this invention is illustrated in connection with a three-gang motor. The overall motor assembly is described and claimed in a co-pending application of Dale A. White and Edward Latta, Ser. No. 658,159, filed Aug. 3, 1967, entitled "Gang Motor Assembly" and assigned to the assignee of this application. Since this bearing assembly is not restricted to any particular motor structure, only that portion of the motor necessary to an understanding of the present invention will be described. Reliance is placed on the co-pending application for a complete description of the motor should one become necessary.

Motor 10 includes an outer housing made up of housing halves 12 and 14. The housing halves are generally dished and have magnetic bodies 16 and 18 supported therein. Each half includes a marginal flange 20 and 22, these flanges overlying one another and being suitably joined to establish the connection between housing halves. For example, the connection may be made by layer 24 of epoxy or other suitable adhesive. The magnetic bodies include depressions 26, 28, 30 and 32, 34, 36 cooperating to define a number of areas for receipt of armature 38.

The general construction of the armatures 38 is conventional but it should be noted that armature shaft 40 extends beyond armature shoulders 42 and 44 at both of the opposite axial ends of the armature. The bearing support for the armature, or armatures, is established at these axial end extensions.

Figure 2:
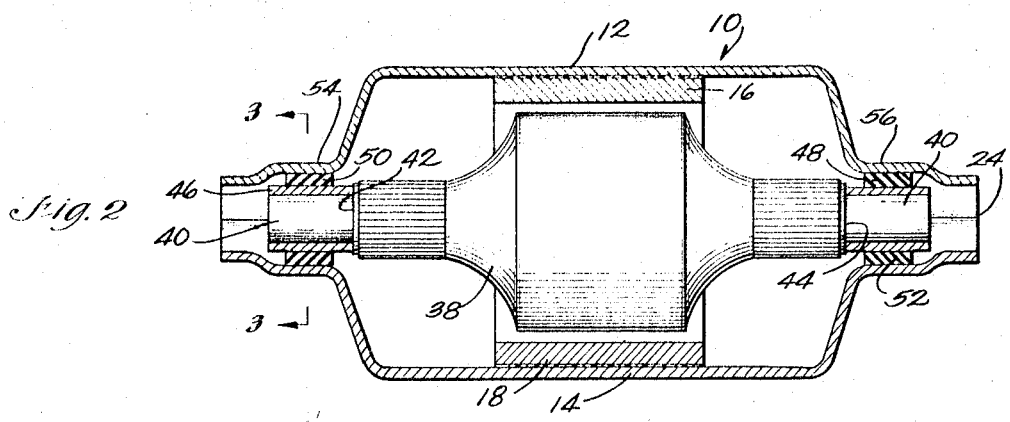
FIG. 2 is an axial section through one of the motor sections.
Figure 3:
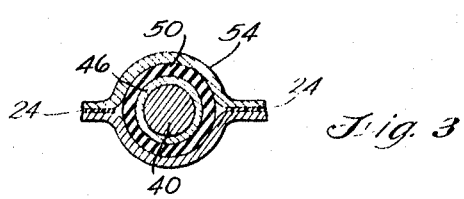
FIG. 3 is a section generally along line 3—3 in FIG. 2.

With reference to FIGS. 2 and 3, the specific bearing support for the armature will be described, it being appreciated that in the disclosed arrangement the same bearing support is utilized for all three armatures. Cylindrical sleeve bearings 46 and 48 are positioned on each of the armature shaft extensions. The sleeve bearings can be of any suitable material such as sintered bronze. The sleeve bearings include a central bore which fits onto the shaft extensions. Sleeves 50 and 52 are fitted over the outer surface of each of the sleeve bearings, these sleeves can be made of any suitable resilient material such as rubber.

The assembly consisting of the sleeve bearings, resilient sleeves and the armature shaft extensions are received in bearing areas provided in housing 10. Preferably, these bearing receiving areas are defined by deformed portions in the housing. Specifically, embossed portions 54 and 56 are provided in flanges 20 and 22 and complement each other so that when the housing halves are connected these embossed portions form generally circular areas for receipt of the bearing assemblies. In the final assembly, resilient sleeves 50 and 52 are compressed between the embossed portions 54, 56 and the sleeve bearings and will therefore positively hold the sleeve bearings in fixed position with respect to housing 10. During assembly the sleeve bearings are placed on the armature shaft ends in engagement with shoulder 42 and 44 or, in other words, with a desired axial spacing therebetween sufficient to eliminate any end play in the armature assembly. The armature, with the bearings and resilient sleeves arranged thereon as just described, is placed in the lower housing half. At this point in assembly additional adjustment of the sleeve bearings can be made to achieve the desired axial spacing therebetween to eliminate end play. When the bearings have been properly positioned the upper half of the housing is placed over the lower half compressing the resilient sleeves between the bearings and the inner surfaces of the embossed areas. With the baerings engaging oppositely facing, generally radial shoulders 42 and 44 and the bearings positively held against axial movement, the armature cannot move axially. Thus all end play in the armature has been eliminated. This is accomplished with a bearing support which has a relatively simplified construction and which also lends itself well to automated assembly procedures.

What is claimed is:
1. A motor assembly comprising, in combination,
  a motor housing comprising first and second housing sections having a juncture therebetween,
  a field generating assembly,
  an armature assembly including an armature shaft, means defining first and second axially aligned bearing receiving means in said motor assembly at said juncture, first and second bearing means on said armature shaft and arranged in relative axial spaced relation and movable relative to each other and said armature assembly to achieve a desired adjusted axial spacing therebetween, said bearing means disposed one in said first bearing receiving means and the other in said second bearing receiving means, means engageable with said first and second bearing means and operative, when so engaged, to limit the relative axial movement of said first and second bearing means and said armature shaft, and resilient means providing the connection between each of said first and second bearing means and its respective bearing receiving means, said resilient means holding said first and second bearing means in said adjusted axial positions and in engagement with said means for limiting axial movement.

2. The motor assembly of claim 1 wherein said first and second bearing means comprise first and second bearing members having a cylindrical bore and slideable axially on said shaft into and out of engagement with said means for limiting axial movement.

3. The motor assembly of claim 2 wherein said armature shaft has first and second axial spaced extensions on which said first and second bearing members, respectively, are received, and wherein said means for limiting axial movement comprise generally radial shoulders at each of said first and second extensions, the shoulder at said first extension facing in an opposite axial direction with respect to the shoulder at said second extension.

4. The motor assembly of claim 1 wherein said bearing receiving means comprise axially aligned deformed areas in said housing, said armature shaft includes axial extensions projecting from the opposite axial ends of said armature assembly toward said deformed areas, said first and second bearing means comprise first and second bearing members having a cylindrical bore and slidable axially on said shaft extensions, and each of said bearing members extends into a respective one of said deformed areas with said resilient means engaged between said first and second bearing means and the surfaces of their respective deformed area.

5. The motor assembly of claim 4 wherein said means for limiting axial movement comprises a generally radial shoulder disposed at each of said axial extensions but spaced inwardly of the outer axial ends thereof.

6. A motor assembly comprising, in combination, a motor housing comprising first and second housing sections having a juncture therebetween, a field generating assembly, an armature assembly including an armature shaft, means limiting movement of said armature assembly in one axial direction, means defining bearing receiving means in said motor assembly at said juncture, at least one bearing means engaging said armature assembly and movable for adjustment relative to said armature asembly, said bearing means extending into said bearing receiving means, means engageable with said bearing means and operative, when so engaged, to limit axial movement of said armature assembly in an opposite axial direction, and means providing the connection between said bearing means and said bearing receiving means to hold said bearing means in an adjusted position with respect to said armature assembly in engagement with said means for limiting axial movement of said armature assembly in said opposite direction.

7. The motor assembly of claim 6 wherein, said armature assembly includes an armature shaft having an axial extension at one axial end of said armature assembly, said bearing means comprises a bearing member having an outer surface and a generally cylindrical bore engaged on said axial extension, and said means engaged between said bearing means and said bearing receiving means comprises a resilient member embracing at least a portion of the outer surface of said bearing member.

8. A motor assembly comprising, in combination, a housing including first and second interconnected sections having a juncture therebetween, a field generating assembly, an armature assembly including an armature shaft, said armature shaft having an axial extension projecting from the opposite axial ends of said armature assembly, deformed areas in each of said sections at said juncture and being complementary to define axially aligned bearing receiving means in said housing, first and second bearing members each having cylindrical bore and one arranged on each of said shaft extensions, said first and second bearing members slidable axially on said shaft extensions relative to each other and said armature assembly to achieve a desired adjustable axial spacing therebetween, each of said bearing members extending into respective one of said bearing receiving means, a generally radial shoulder at each axial extension but spaced inwardly of the outer axial end thereof to engage and limit relative axial movement of said first and second bearing members and said armature shaft, and resilient means engaged between each of the first and second bearing members and its respective bearing receiving means, said resilient means holding said first and second bearing members in said adjusted axial positions and in engagement with said shoulders.

9. The motor assembly of claim 8 wherein said bearing members each comprise a generally cylindrical sleeve bearing and said resilient means comprise cylindrical resilient sleeve members surrounding said sleeve bearings and compressed between each of said sleeve bearings and the surface of a respective one of said deformed area.

10. A motor assembly comprising, in combination, a motor housing, a field generating assembly, an armature assembly including an armature shaft having an axial extension at one end of said armature assembly, means limiting movement of said armature assembly in one axial direction, means defining bearing receiving means in said motor housing, a cylindrical sleeve bearing on said axial extension and movable for adjustment relative to said armature assembly, said bearing extending into said bearing receiving means, a generally radial shoulder on said axial extension for engagement with said bearing to limit axial movement thereof on said armature shaft extension and, when engaged with said bearing, limiting axial movement of said armature assembly in an opposite axial direction, and a resilient sleeve around the outer surface of said bearing and compressed between said bearing and said bearing receiving means to hold said bearing in an adjusted position with respect to said armature assembly in engagement with said radial shoulder to limit movement of said armature assembly in said opposite direction.

11. A motor assembly comprising, in combination,
a motor housing comprising first and second housing sections having a juncture therebetween,
a field generating assembly,
an armature assembly including an armature shaft,
means defining first and second axially aligned bearing receiving means in said motor housing at said juncture,
first and second generally cylindrical bearings arranged in relative axial spaced relation on said armature shaft,
means engageable with said first and second bearings and operative, when so engaged, to limit the relative axial movement of said first and second bearings and said armature shaft,
and means disposed circumferentially around the outer surface of said cylindrical bearings and disposed between said outer surface and said first and second bearing receiving means to provide the connection between said first and second bearings and said bearing receiving means holding first and second bearing means in said adjusted axial position.

12. The motor assembly of claim 11 wherein said means disposed circumferentially around said bearing comprises a resilient member.

References Cited

UNITED STATES PATENTS

| | | | |
|---|---|---|---|
| 1,778,992 | 10/1930 | Wulfert | 310—51 X |
| 2,929,944 | 3/1960 | Shewmon | 310—67 |
| 3,114,060 | 12/1963 | Goettl | 310—51 |
| 3,156,838 | 11/1964 | Winther | 310—42 |
| 3,253,170 | 5/1966 | Phillips et al. | 310—51 X |
| 3,391,290 | 7/1968 | Hahndorf et al. | 310—42 |

WARREN E. RAY, Primary Examiner

U.S. Cl. X.R.

310—51, 89, 114